United States Patent [19]
Adler

[11] 3,814,028
[45] June 4, 1974

[54] FREIGHT CAR WITH DEPRESSED CENTER SECTION

[75] Inventor: Franklin P. Adler, Michigan City, Ind.

[73] Assignee: Pullman Transport Leasing Company, Chicago, Ill.

[22] Filed: Apr. 9, 1973

[21] Appl. No.: 349,593

[52] U.S. Cl............. 105/366 R, 105/367, 105/422
[51] Int. Cl............................................ B61d 17/00
[58] Field of Search........ 105/366 R, 367, 368, 376, 105/422, 414, 416

[56] References Cited
UNITED STATES PATENTS

| | | |
|---|---|---|
| 1,764,737 | 6/1930 | Lundberg et al. ................. 105/367 |
| 1,894,534 | 1/1933 | Dolan............................ 105/368 R |
| 2,587,754 | 3/1952 | Osborn ............................ 105/422 |
| 2,812,727 | 11/1957 | Dorsey............................. 105/367 |
| 2,996,020 | 8/1961 | Udstad............................. 105/367 |

Primary Examiner—M. Henson Wood, Jr.
Assistant Examiner—Gene A. Church
Attorney, Agent, or Firm—Hilmond O. Vogel

[57] ABSTRACT

A freight car having end doors adapted to carry large bulky commodities by providing a depressed or lowered center section extending between the spaced trucks, thus permitting the stacking of large commodities which would ordinarily not be permissable due to the restrictive car height limitations. The freight car also includes a trolley mounted crane which permits rapid and efficient loading and unloading of cargo.

5 Claims, 5 Drawing Figures

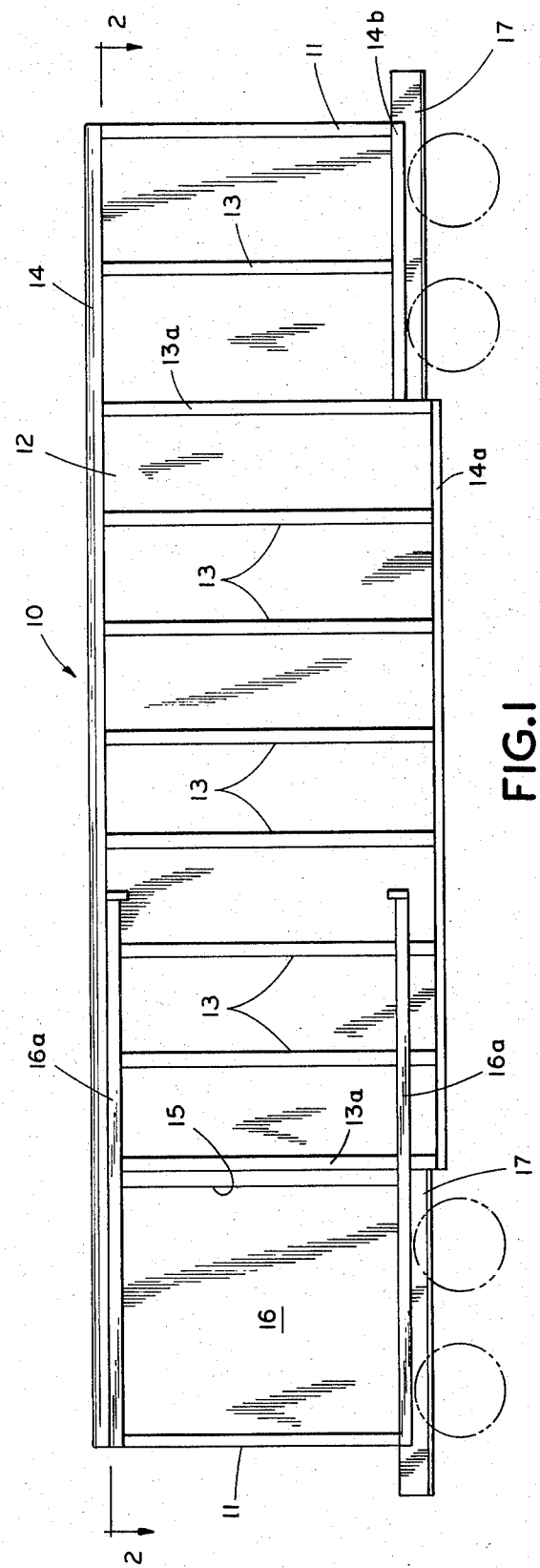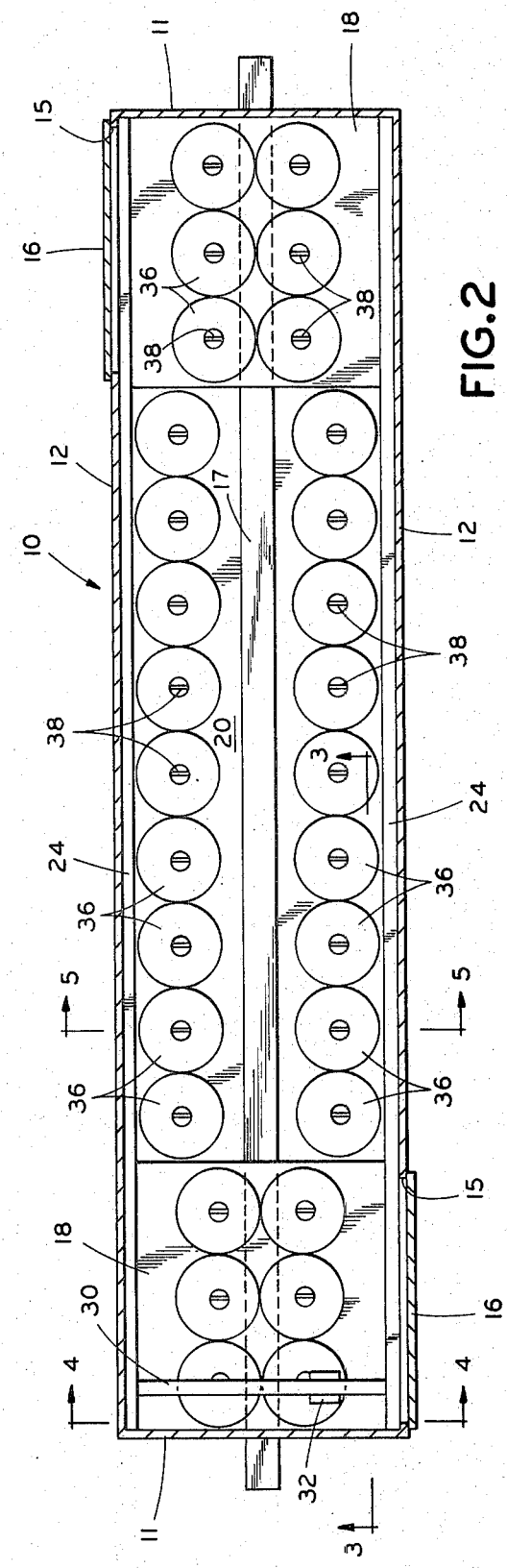

FREIGHT CAR WITH DEPRESSED CENTER SECTION

BACKGROUND OF THE INVENTION

1. Field of the Invention

This invention pertains to railway freight vehicles and in particular to those specifically designed to carry a special commodity.

2. Description of the Prior Art

Prior art specialty freight cars which are designed to carry a specific commodity generally include specialized hold down or stacking members which permit the commodities to be more efficiently loaded into the space available. Prior art railway vehicles which have included a depressed floor are illustrated by the U.S. Pat. No. 2,996,020 to S. F. Udastad which provides a vehicle with a depressed floor extending between the spaced trucks and extending on each side of a through center sill, the vehicle being intended for the transport of automobiles vertically positioned in the car and attached to the pivotable side wall panels. The present invention contemplates a depressed central portion in a freight car having end doors and an overhead crane to facilitate loading and unloading of the commodities.

SUMMARY

The present invention is directed to a railway freight car having a depressed center portion extending between the spaced supporting truck members. By lowering the floor in the car central portion large bulky commodities, such as rolls of paper, may be stacked upon one another and easily loaded and unloaded from the car central section by use of an overhead crane. The car is loaded through diagonally spaced end door members which permit full utilization of the depressed car center portion which may be used for transporting lading.

It is therefore an object of the present invention to provide a freight car having a depressed central portion extending below the car center sill and thereby permitting the stacking of large bulky commodities in a two-tier arrangement.

It is yet another object of the present invention to provide a railway vehicle with a depressed central portion and having diagonally opposed end door members adjacent the car end portion and including an overhead crane for lifting transported commodities into the car end portions for unloading.

These and other objects of the invention will become apparent from reference to the following description, attached drawings and appended claims.

BRIEF DESCRIPTION OF THE DRAWINGS

FIG. 1 is a side elevational view of the railway freight car of the present invention;

FIG. 2 is a sectional plan view taken along line 2—2 of FIG. 1;

DESCRIPTION OF THE PREFERRED EMBODIMENT

Figure 3:
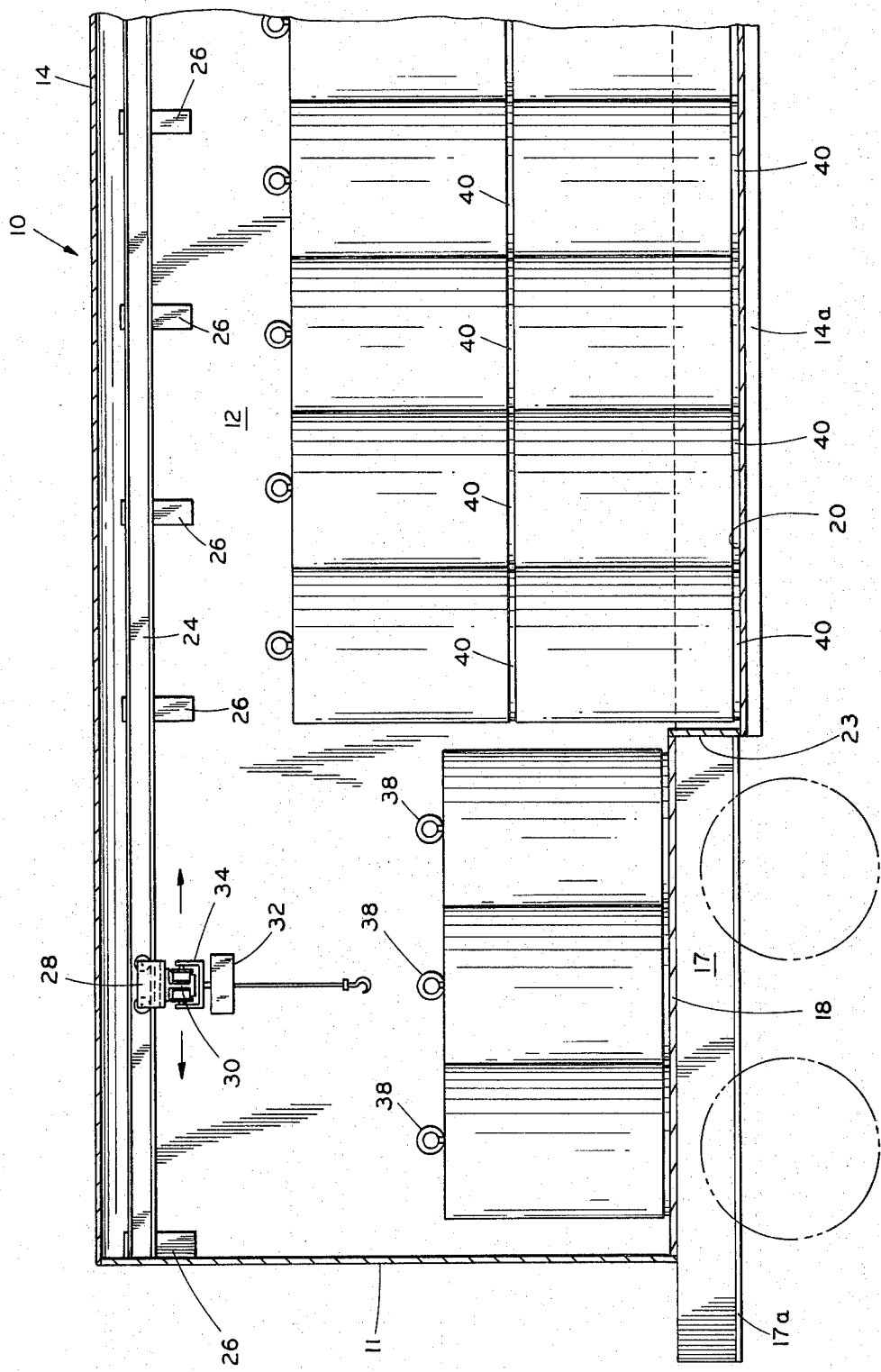
FIG. 3 is an enlarged sectional view of the end portion of the freight vehicle.
Figure 4:
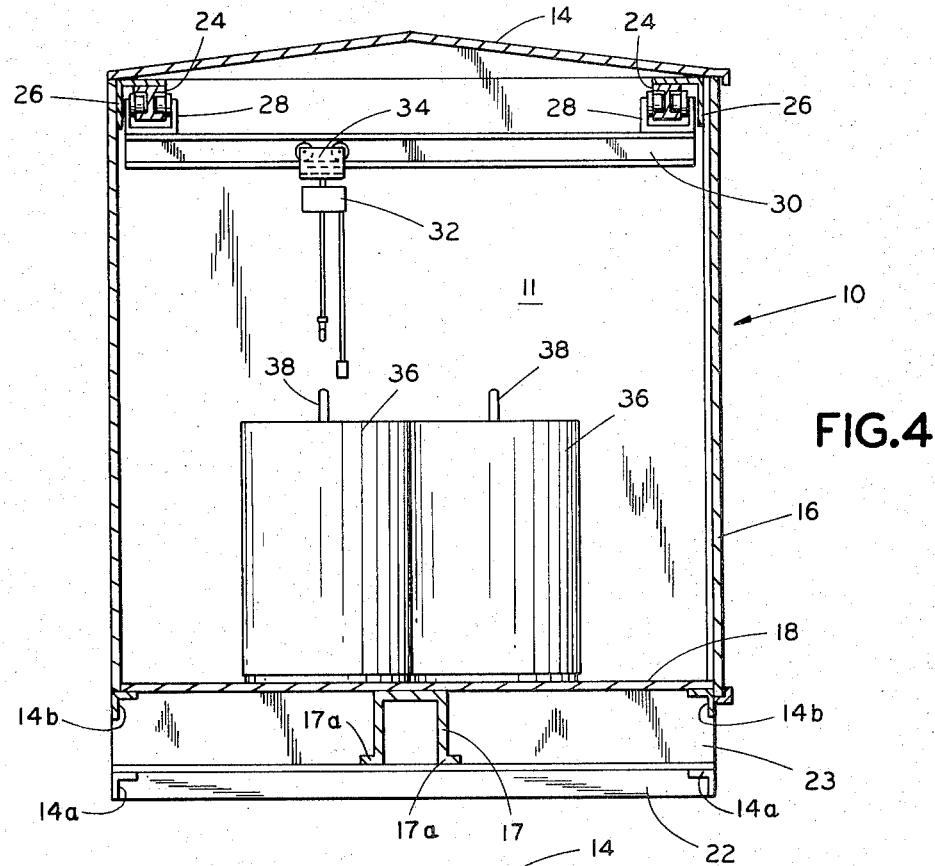
FIG. 4 is a sectional view taken generally along line 4—4 of FIG. 2.
Figure 5:
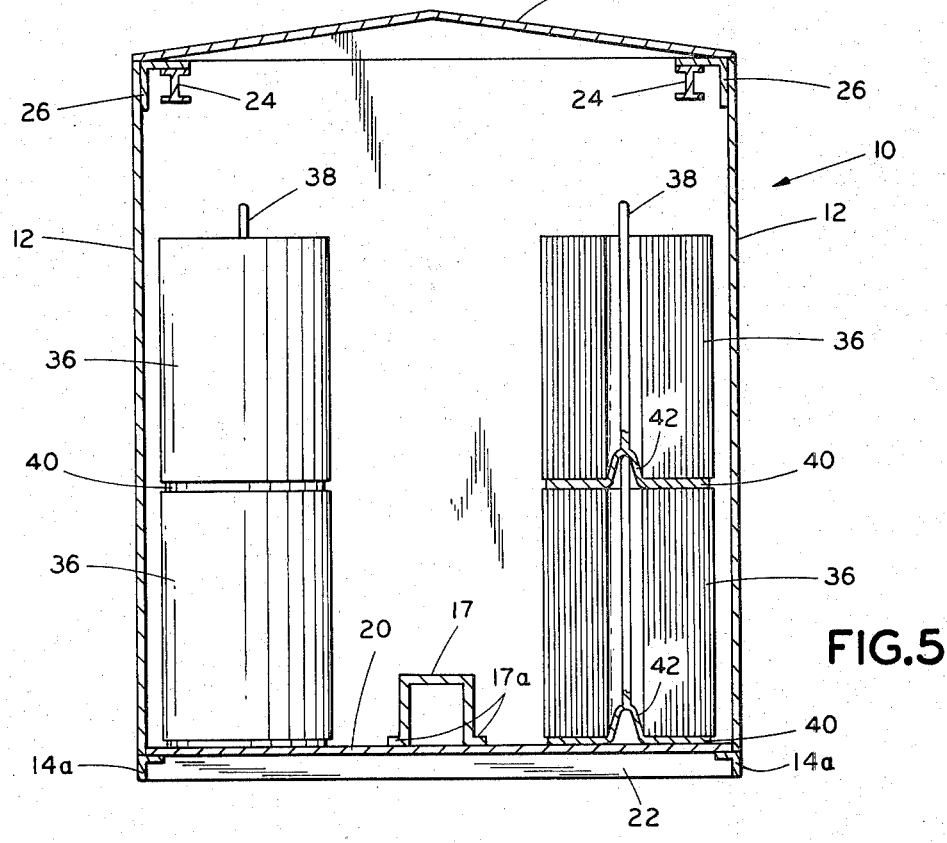
FIG. 5 is a cross sectional view taken along line 5—5 of FIG. 2.

With reference to the drawings and in particular to FIG. 1, there is disclosed the general side elevational arrangement of the railway specialty car of the present invention. The freight car is designated by the numeral 10 and has the usual spaced end wall 11 and side wall unit 12 reinforced by the vertically extending wall posts 13. These wall posts 13 extend vertically between the roof 14 and the side sill members 14a, 14b and thereby form a rigid side wall unit which resists bulging due to loading compressed by the dead load being transported and by active bulging loads which occur during transport. Sill connecting wall posts 13a have lower portions which form a force transferring connection between the vertically spaced side sill members 14a, 14b. The freight vehicle also includes diagonally opposed door openings 15 which include the usual framing members and have a sliding door 16 positioned for reciprocal movement thereacross. The door support runners 16a provide a convenient mounting track to supply the structure required for the sliding and supporting of the door 16. Runners 16a combine with the adjacent side sill portions to dump forces into the side wall unit 12 and reinforce the car end portion around each door opening 15.

The main structural member of the freight vehicle is a longitudinally through center sill 17 which extends the length of the vehicle. The supporting floor sheets 18 are positioned atop the center sill at the car end portions and the interior supporting floor 20 positioned at the depressed central portion of the vehicle is fixedly attached to the laterally extending bottom flanges 17a of the hat shaped center sill 17. The transversely extending cross members 22 are also attached to the underside of the center sill 17 and provide vertical support to the lading in the area of the depressed central portion of the vehicle. A deep section cross bearer member 23 is positioned at the drop off at the junction of the raised and depressed floor sections 18 and 20, respectively, and forms a structural connection between these two support units.

Adjacent the roof unit 14 and positioned along side the side wall unit 12 is a trolley and rail assembly 24 which is fixedly attached to the side wall units by the supporting brackets 26 which also function as top chord brackets. The trolley rail itself is an I-beam member having a bottom support flange which provides a guide surface for the roller hanger member 28. Connecting the spaced roller members 28 is a cross bearer beam member 30 which provides a mounting surface to allow for rolling movement of the crane 32 which is attached to the cross beam 30 by crane hanger member having the usual roller members and designated by the numeral 34. Thus the crane is positioned in the freight vehicle and adapted to move longitudinally and transversely thereby permitting total access to the interior of the freight vehicle for attachment to transported cargo.

The freight car 10 of the present invention which includes a depressed central portion is adapted particularly for the shipment of large rolls of paper such as are used in the printing industry and heretofore have been transported in single tiered arrangement which left unused a large volume of the freight vehicle. It has been objectionable to place the rolls on their side because of damage to the edges of the paper caused by impact with the side walls and door openings when the rolls are loaded into the vehicle.

By depressing the car central portion it is noticed that the paper rolls 36 may be positioned in the vehicle in a double tiered arrangement by utilizing a center lift rod 38 which extends through the centrally disposed opening of each roll of paper and is connected to a bottom supporting pallet member 40. The bottom support pallets 40 include an upwardly extending recess 42 which centers the paper roll on the pallet and allows for conveniently hooking the center rod 38 into the bottom support. The center rod 38 may be engaged by the hook member of the crane 32 and conveniently lifted and moved to the car end door area for convenient unloading. It is also noticed that the paper rolls 36 are positioned about the longitudinally extending center sill 17 in the depressed center portion of the freight vehicle and are stored away from the side walls and generally above the center sill at the car end portions. This permits the doors to be easily opened and workmen may enter the vehicle and easily and rapidly unload the rolls of paper stored at the car end portions and then have ready access to the double tiered paper rolls 36 which are stored in a tiered fashion in the car center portion.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A railway freight vehicle running on spaced trucks and adapted to transport a large volume of a bulky commodity and including:
   a reinforced superstructure including side wall units having wall posts and said superstructure also having a roof unit and a transversely extending end wall unit interconnecting said side wall units;
   a continuous center sill extending the length of said vehicle and having a generally hat shaped cross section with laterally and horizontally extending bottom flange portions;
   said vehicle having a bi-level floor structure comprising raised end sections and a depressed central floor segment and said end sections having portions mounted atop said center sill and fixedly attached thereto, and further, said depressed floor segment having portions attached to said bottom flange portions of the center sill and extending laterally outwardly therefrom;
   each side wall unit having a door means adjacent one of the raised end sections;
   overhead crane means having a pair of spaced rail members extending the length of said vehicle;
   top chord bracket means connected at the junction of each side wall unit and the adjacent roof unit and forming support means for attachment of said rail members.

2. The invention according to claim 1, and:
   said vehicle having a stepped two level side sill structure comprising a first lower sill portion attached at the outer margin of the depressed central floor at the junction with the adjacent side wall unit, and second upper sill portions attached at the outer margin of each raised end section.

3. The invention according to claim 1, and:
   said door means including a single door opening and associated movable door member in each side wall unit and each door means positioned at diagonally opposed portions of the vehicle.

4. The invention according to claim 2, and:
   said wall posts including sill connecting wall post members having force transmitting portions interconnecting said first lower sill portion with said second upper sill portion.

5. The invention according to claim 3, and:
   door runners for supporting and guiding said movable door member and including an upper member and a lower member and said lower runner of each door being positioned outwardly adjacent the associated second sill portion thereby forming a reinforced second upper sill means.

* * * * *